Patented Aug. 14, 1951

2,564,276

UNITED STATES PATENT OFFICE 2,564,276

PRESERVING COMPOSITION

Gordon James Pritchard, London, England

No Drawing. Original application June 23, 1947, Serial No. 756,564. Divided and this application August 24, 1948, Serial No. 45,968. In Great Britain October 30, 1945

7 Claims. (Cl. 167—30)

This invention is a division of my application Serial No. 756,564, filed June 23, 1947, now Patent No. 2,546,274, and is concerned with improvements in and relating to the preservation of protein material, timber or cellulosic material and preparations therefor.

British Specifications Nos. 547,564 and 552,751 describe the preparation of substances useful for the treatment of burns and other lesions, and other like purposes, by causing metals or organic compounds having bactericidal, fungicidal or other useful properties to combine with certain disubstituted methane compounds, there referred to as D. S. M. compounds.

These D. S. M. compounds are prepared by condensation of aromatic mono-, di- or polysulphonic acids, which may also carry hydroxy, halogen or other substituents so long as replaceable hydrogen atoms remain in the aromatic ring, with formaldehyde, with production of combinations of the general formula

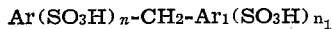

where Ar, $Ar_1$ are residues of aromatic ring structures with or without other substituents and carrying also the sulphonic acid groups, and $n$, $n_1$ are 1, 2, 3 or more. Generally, but not necessarily $Ar(SO_3H)_n$ and $Ar_1(SO_3H)_n$ are identical.

U. S. Application Serial No. 756,753, filed June 23, 1947, by Shelia Edith Bywater and myself, now Patent No. 2,498,920, describes the preparation of compounds by reacting aryl organometallic compounds having bactericidal, fungicidal and other useful properties with D. S. M. compounds.

I have found as a further development of the researches that led to the processes described in the above-mentioned application and patents that new and valuable compounds of a kindred nature can be prepared by the use in place of formaldehyde of other compounds of aldehydic function, which are condensed with aromatic sulphonic acids of the kinds described and the resulting compounds combined with organometallic compounds. I have found further that the new compounds are useful in the treatment of protein material, timber and cellulosic material as rot-proofing, mold preventing and preserving agents.

The new compounds which I may use for the purpose of the present invention may be prepared by condensing naphthalene-2-sulphonic acid or 2-naphthol-6-sulphonic acid with compounds of aldehydic function containing at least two carbon atoms, or with ketones and converting the resulting tri- or tetrasubstituted methane compounds (hereinafter referred to as "T. S. M. compounds") into salt-like bodies by combining them with phenyl mercury compounds.

According to the present invention therefore I provide a process for the preservation of protein material, timber and other cellulosic material in which the material is treated with a compound obtained by the reaction of a T. S. M. compound as defined above with a phenyl mercury compound.

The formation of the sulphonic acid condensation products which by combining with the organo-metallic compounds, form the new salts may be represented by the following equation:

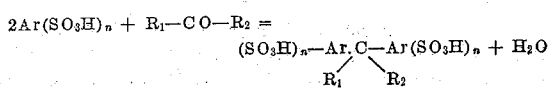

where Ar is the residue of naphthalene-2-sulphonic acid or 2-naphthol-6-sulphonic acid and $R_1$, $R_2$ are the radicles drawn from the carbonyl compound, and may be alkyl or aryl. Where the carbonyl compound is an aldehyde, $R_1$ will be hydrogen.

The use of mixtures of aryl sulphonic acids will of course lead to mixed tri- and tetra-substituted methane compounds along with the two symmetrical tri- and tetra-substituted methane compounds.

As compounds of aldehydic function I may use aliphatic, aromatic or cycloaliphatic aldehydes, both carbocyclic and hetero-cyclic, as well as compounds yielding such derivatives, such as polymers or acetals or the like, or compounds having latent aldehydic properties, such as the aldose sugars. I may also use ketones, which will of course lead to tetra-substituted methane compounds.

The protein, timber or cellulosic material may, if desired, be treated with a solution in water or other convenient solvent of the desired compound. I have found further, however, that it is often desirable that aqueous solutions of the new compounds should contain an excess of either the T. S. M. compound or of the parent sulphonic acid. It appears that the solubility of the new compounds is increased by the presence of this excess, thus enabling more thorough penetration to be obtained. Furthermore I have found that it is desirable that the pH of the aqueous solution should lie within the range 4–6.5; this value may be obtained by the use of the correct quantity of T. S. M. compound or parent sulphonic acid or any excess of those substances may be used and the pH finally adjusted by the use of, for example, a mineral acid or alkali.

In order that the invention may be well understood the following examples are given only as illustrations:

*Example 1*

20.8 parts by weight of naphthalene-2-sulphonic acid (10 equivalents) are fused at 100° C. and 3.36 parts by weight of phenyl mercury acetate (1 equivalent) are slowly fed into the salt with stirring; this dissolves and acetic acid vapour is given off, 2.4 parts by weight of acetaldehyde (11 equivalents) are then added in three portions over one hour and the reaction mixture heated for 6 hours at 100° C. until the smell of the acetaldehyde has disappeared; the resulting solution of the phenyl mercury complex in the T. S. M. compound derived from naphthalene-2-sulphonic acid may be diluted with 100 parts by weight of water and neutralised to the desired pH by the addition of sodium hydroxide.

*Example 2*

1 part by weight of the phenyl-mercury complex of bis-(naphthalene-2-sulphonic acid) methyl methane was dissolved in 78 parts by weight of a 33% solution of bis-(naphthalene-2-sulphonic acid) methyl methane by warming gently. The solution was neutralised to pH 7 by addition of ammonia in 25% aqueous solution, and the whole then diluted by addition of 10,000 parts by weight of water. The solution was then ready for use.

*Example 3*

1 part by weight of the phenyl mercury complex of bis-(naphthalene-2-sulphonic acid) methyl methane was dissolved in 2.6 parts by weight of bis-(naphthalene-2-sulphonic acid) methyl methane. 4 parts by weight of sodium fluoride was then added to the solution and the whole diluted to 10,000 parts and the pH of the solution adjusted to 4–4.5 Sodium dichromate and dinitrophenol may with advantage be incorporated in this solution.

*Example 4*

The phenyl mercury complex obtained by the reaction of phenyl mercury acetate with bis-(naphthalene-2-sulphonic acid) methyl methane was dissolved to give 0.1% solution of bis-(naphthalene-2-sulphonic acid) methyl methane; to 100 parts of this solution 4 parts by weight of potassium bichromate was added followed by 4 parts of sodium fluoride. The solution was then ready for use in wood impregnation.

*Example 5*

13.4 parts phenyl mercuric acetate were treated with 72.8 parts of the condensation product of 2-hydroxynaphthalene-6-sulphonic acid and octyl aldehyde in aqueous solution and diluted to 40,000 parts with water giving the same concentration of mercury as in the preceding example. This was applied to timber in the same way.

*Example 6*

3.36 parts by weight of phenyl mercury acetate was dissolved in 80 parts by weight of ethyl alcohol (74 O. P.) and 7.37 parts by weight of bis-(2-naphthol-6-sulphonic acid) diaminomethane added to the hot alcoholic solution; the solution was boiled for a short time with charcoal, filtered, and concentrated to half its volume and allowed to crystallize. The resulting compound was found to be useful for the preservation of timber when used as described in the previous examples.

*Example 7*

6.7 parts by weight of phenyl mercury acetate were dissolved in 120 parts by weight of ethyl alcohol (74 O. P.) and 15 parts by weight of a 37% solution of the T. S. M. compound prepared by condensing piperonal with naphthalene-2-sulphonic acid added; the whole was heated to boiling and on cooling 2.7 parts by weight of the phenyl mercury complex separated as a greyish powder.

Found: Hg, 49.5%

$C_{40}H_{28}O_8S_2Hg_2$ (the true salt) requires Hg=36.43%

$C_{52}H_{40}O_{10}S_2Hg_4$ (the basic salt) requires Hg=47.5%.

*Example 8*

In place of the T. S. M. compound prepared by condensing piperonal with naphthalene-2-sulphonic acid in Example 7, the T. S. M. compound prepared by reacting vanillin with naphthalene-2-sulphonic acid was used, 17.6 parts by weight of a 31% solution of this T. S. M. compound was added to 6.72 parts by weight of phenyl mercury acetate dissolved in 120 parts by weight of ethyl alcohol (74 O. P.); the solution was charcoaled and filtered, and on cooling the phenyl mercury complex separated as a purplish powder.

Found: Hg, 45.3%

$C_{40}H_{30}O_8S_2Hg_2$ (the true salt) requires Hg, 36.4%

$C_{52}H_{42}O_{10}S_2Hg_4$ (the basic salt) requires Hg, 47.4%.

*Example 9*

In a similar fashion the T. S. M. compound prepared by condensing anisaldehyde naphthalene-2-sulphonic acid was allowed to react with phenyl mercury acetate; 16.45 parts by weight of a 28.1% aqueous solution of this T. S. M. compound was added to 5.8 parts by weight of phenyl mercury acetate dissolved in 128 parts by weight of ethyl alcohol (74 O. P.) the phenyl mercury complex separated on concentrating the alcoholic solution as a pinkish buff powder.

Found: Hg, 47.4%

$C_{40}H_{30}O_7S_2Hg_2$ (the true salt) requires Hg, 37.1%

$C_{50}H_{42}O_9S_2Hg_4$ (the basic salt) requires Hg, 47.7%.

*Example 10*

In place of the T. S. M. compound prepared by condensing piperonal with naphthalene-2-sulphonic acid in Example 7, the T. S. M. compound prepared by reacting acetone with naphthalene-2-sulphonic acid was used, a 29% aqueous solution was added to 6.7 parts by weight of phenyl mercury acetate dissolved in 120 parts by weight of ethyl alcohol (74 O. P.) until the whole reacted just acid to Congo paper. The precipitate which separated was filtered off and analyzed as follows:

Found: Hg, 52.1%

$C_{25}H_{28}O_6S_2Hg_2$ (the true salt) requires Hg, 39.8%

$C_{47}H_{40}O_8S_2Hg_4$ (the basic salt) requires Hg, 50.2%.

Example 11

11.0 parts by weight of a 45% aqueous solution of the T. S. M. compound prepared by condensing benzaldehyde with naphthalene-2-sulphonic acid was added to 6.72 parts by weight of phenyl mercury acetate dissolved in 120 parts by weight of ethyl alcohol (74 O. P.) on evaporating the phenyl mercury complex was obtained as a buff powder.

Found: Hg, 49.9%

$C_{39}H_{28}O_6S_2Hg_2$ (the true salt) requires Hg=37.9%

$C_{51}H_{40}O_8S_2Hg_4$ (the basic salt) requires Hg=48.8%.

I claim:

1. A product having the property of preserving timber comprising an aqueous solution of the bis phenyl mercury salt of bis-(naphthalene-2-sulphonic acid)-methyl methane said aqueous solution also containing an excess of naphthalene-2-sulphonic acid.

2. A product having the property of preserving timber comprising an aqueous solution of the bis phenyl mercury salt of bis-(naphthalene-2-sulphonic acid)-methyl methane said aqueous solution also comprising an excess of bis-(naphthalene-2-sulphonic acid)-methyl methane.

3. The product defined in claim 1 in which the pH of said aqueous solution is within the range of from 4 to 6.5.

4. The product defined in claim 2 in which the pH of said aqueous solution is within the range of from 4 to 6.5.

5. A product having the property of preserving material selected from the group consisting of protein material, timber and cellulosic material comprising an aqueous solution of a phenyl mercury salt of an acid of the general formula

where R and $R_1$ are each selected from the group consisting of a naphthalene-2-sulphonic acid residue ($C_{10}H_7SO_3H$) and a 2-naphthol-6-sulphonic acid residue ($C_{10}H_7(OH)SO_3H$), $R_2$ is a member of the group consisting of alkyl and aryl groups and hydrogen and $R_3$ is a member of the group consisting of alkyl and aryl groups.

6. The product defined in claim 5 in which said aqueous solution also contains an excess of a compound selected from the group consisting of said acid of the general formula

naphthalene-2-sulphonic acid and 2-naphthol-6-sulphonic acid.

7. The product defined in claim 5 in which said aqueous solution contains an excess of a compound selected from the group consisting of said acid of the general formula

naphthalene-2-sulphonic acid and 2-naphthol-6-sulphonic acid, the pH of said solution lying within the range of from 4 to 6.5.

GORDON JAMES PRITCHARD.

REFERENCES CITED

The following references are of record in the file of this patent:

UNITED STATES PATENTS

| Number | Name | Date |
|---|---|---|
| 1,986,044 | Casaburi | Jan. 1, 1935 |
| 2,215,457 | Anderson | Sept. 24, 1940 |

FOREIGN PATENTS

| Number | Country | Date |
|---|---|---|
| 547,564 | Great Britain | Sept. 2, 1942 |
| 552,751 | Great Britain | Apr. 22, 1943 |

Certificate of Correction

Patent No. 2,564,276                                          August 14, 1951

GORDON JAMES PRITCHARD

It is hereby certified that the above numbered patent was erroneously issued to the inventor, said "Pritchard", whereas said patent should have issued to *Ward Blenkinsop & Company, Limited, of London, England, a company of Great Britain,* as assignee of the entire interest therein; and that the said Letters Patent should be read as corrected above, so that the same may conform to the record of the case in the Patent Office.

Signed and sealed this 16th day of October, A. D. 1951.

[SEAL]

THOMAS F. MURPHY,
*Assistant Commissioner of Patents.*